United States Patent
Yehezkely et al.

(10) Patent No.: US 8,670,322 B2
(45) Date of Patent: Mar. 11, 2014

(54) SINGLE TRANSMISSION LINE FOR CONNECTING RADIO FREQUENCY MODULES IN AN ELECTRONIC DEVICE

(75) Inventors: Alon Yehezkely, Tel-Aviv (IL); Ori Sasson, Nesher (IL)

(73) Assignee: Wilocity, Ltd., Caesarea (IL)

( * ) Notice: Subject to any disclaimer, the term of this patent is extended or adjusted under 35 U.S.C. 154(b) by 257 days.

(21) Appl. No.: 13/153,667

(22) Filed: Jun. 6, 2011

(65) Prior Publication Data

US 2012/0307695 A1    Dec. 6, 2012

(51) Int. Cl.
*H04L 12/26* (2006.01)
*H04J 1/00* (2006.01)
*H04L 12/28* (2006.01)
*H03H 7/38* (2006.01)
*H03B 1/00* (2006.01)

(52) U.S. Cl.
USPC ........... 370/236; 370/343; 370/351; 333/124; 333/32; 331/74

(58) Field of Classification Search
USPC ........ 370/229, 235, 236, 351; 455/73, 85–86, 455/130, 132, 141
See application file for complete search history.

(56) References Cited

U.S. PATENT DOCUMENTS

| | | | |
|---|---|---|---|
| 6,175,324 B1 * | 1/2001 | Valentine et al. | 342/20 |
| 2006/0223483 A1 * | 10/2006 | Behzad | 455/323 |
| 2007/0063771 A1 * | 3/2007 | Pan et al. | 330/149 |
| 2009/0284354 A1 * | 11/2009 | Pinkham | 340/10.3 |
| 2010/0035561 A1 * | 2/2010 | Rettig et al. | 455/73 |
| 2011/0025431 A1 | 2/2011 | Spiegel et al. | |
| 2012/0082068 A1 * | 4/2012 | Yang et al. | 370/277 |

OTHER PUBLICATIONS

"Method and System for 60 GHZ Chipset RF Control Interface"; U.S. Appl. No. 61/421,027; electronically filed on Dec. 8, 2010; US.

* cited by examiner

*Primary Examiner* — Omar Ghowrwal
(74) *Attorney, Agent, or Firm* — Myers Wolin, LLC

(57) ABSTRACT

A millimeter-wave radio frequency (RF) system, and method thereof for transferring multiple signals over a single transmission line connected between modules of a millimeter-wave RF system. The system comprises a single transmission line for connecting a first part of the RF system and a second part of the RF system, the single transmission line transfers a multiplexed signal between the first part and second part, wherein the multiplexed signal includes intermediate frequency (IF) signal, a local oscillator (LO) signal, a control signal, and a power signal; the first part includes a baseband module and a chip-to-line interface module for interfacing between the baseband module and the single transmission line; and the second part includes a RF module and a line-to-chip interface module for interfacing between the RF module and the single transmission line, wherein the first part and the second part are located away from each other.

17 Claims, 8 Drawing Sheets

SINGLE TRANSMISSION LINE FOR CONNECTING RADIO FREQUENCY MODULES IN AN ELECTRONIC DEVICE

TECHNICAL FIELD

The present invention generally relates to radio frequency (RF) systems, and more particularly to enabling connectivity, and transmission of signals between RF modules of a RF system using a single transmission line.

BACKGROUND OF THE INVENTION

The 60 GHz band is an unlicensed band which features a large amount of bandwidth and a large worldwide overlap. The large bandwidth means that a very high volume of information can be transmitted wirelessly. As a result, multiple applications, that require transmission of a large amount of data, can be developed to allow wireless communication around the 60 GHz band. Examples for such applications include, but are not limited to, wireless high definition TV (HDTV), wireless docking stations, wireless Gigabit Ethernet, and many others.

In order to facilitate such applications there is a need to develop integrated circuits (ICs), such as amplifiers, mixers, radio frequency (RF) analog circuits, and active antennas that operate in the 60 GHz frequency range. An RF system typically comprises active and passive modules. The active modules (e.g., a phase-array antenna) require, control and power signals for their operation, which are not required by passive modules (e.g., filters). The various modules are fabricated and packaged as RFICs that can be assembled on a printed circuit board (PCB). The size of the RFIC package may range from several to a few hundred square millimeters.

In the market of consumer electronics, the design of electronic devices, and thus RF modules integrated therein, should meet the constraints of minimum cost, size, and weight. The design of the RF modules should also take into consideration the current assembly of electronic devices, and particularly handheld devices, such as laptop and tablet computers in order to enable efficient transmission and reception of millimeter wave signals.

A schematic diagram illustrating the assembly of a laptop computer 100 that includes an RF system 110 for transmission and reception of millimeter wave signals is shown in FIG. 1. The form factor of the RF system 110 is spread between the base 102 and lid planes 105 of the laptop computer 100.

The RF system 110 includes two parts: a baseband module 120 and RF module 130 respectively connected to the base plane 102 and lid plane 105. The RF module 130 includes active transmit (TX) and receive (RX) antennas. When transmitting signals, the baseband module 120 typically provides the RF module 130 with control, local oscillator (LO), intermediate frequency (IF), and power (DC) signals. The control signal is utilized for functions, such as gain control, RX/TX switching, power level control, sensors, and detectors readouts. Specifically, beam-forming based RF systems require high frequency beam steering operations which are performed under the control of the baseband module 120. The control typically originates at the baseband 120 of the system, and transfers between the baseband module 120 and RF module 130.

The RF module 130 typically performs up-conversion, using a mixer (not shown) on the IF signal(s) to RF signals and then transmits the RF signals through the TX antenna according to the control of the control signals. The power signals are DC voltage signals that power the various components of the RF module 130.

In the receive direction, the RF module 130 receives RF signals at the frequency band of 60 GHz, through the active RX antenna and performs down-conversion, using a mixer, to IF signals using the LO signals, and sends the IF signals to baseband module 120. The operation of the RF module 130 is controlled by the control signal, but certain control information (e.g., feedback signal) is sent back to the baseband module 120. An example for the assembly shown in FIG. 1 can be found in US patent Application Publication 2010/0035561, which is assigned to the common assignee.

Current solutions require least two cables (transmission lines) are needed to transfer the IF, LO, power, and control signals between the baseband and RF modules 120 and 130.

This drawback is critical in millimeter-wave RF systems, e.g., systems that operate in the 60 GHz frequency bands, as the RF module 130 must be located close to the active antennas to perform the functions described above in order to minimize the power loss of the received and transmit signals. Thus, the baseband module 120 is located apart from the RF module 130. Further, because transferring high frequency signals over the cables significantly attenuates the signals, cables that provide low attenuation characteristics are utilized. However, such cables are relativity expensive, thus increasing the bill of material (BoM) of consumer electronics devices.

It would be therefore advantageous to provide a solution for connecting, using a single transmission line, radio frequency modules in an electronic device for use in at least the 60 GHz frequency band.

SUMMARY OF THE INVENTION

Certain embodiments disclosed herein include a method for transferring a plurality of signals over a single transmission line connected between modules of a millimeter-wave RF system. The method comprises setting a frequency plan for separating a frequency spectrum to a baseband frequency band, a local oscillator (LO) frequency band, and a control frequency band; at a first module of the RF system performing: multiplexing, using a plurality of frequency filters, baseband signals, a LO signal, and a control signal to produce a first multiplexed signal, wherein the baseband signals, the LO signal, and the control signal are respectively passed at the baseband frequency band, the LO frequency band, and the control frequency band; inserting a power signal to the first multiplexed signal to produce a second multiplexed signal including the baseband signals, the LO signal, the control signal, and the power signal; and transferring the second multiplexed signal to a second module of the RF system over the single transmission line.

Certain embodiments disclosed herein also include a millimeter-wave radio frequency (RF) system. The system comprises a single transmission line for connecting a first part of the RF system and a second part of the RF system, the single transmission line transfers a multiplexed signal between the first part and second part, wherein the multiplexed signal includes intermediate frequency (IF) signal, a local oscillator (LO) signal, a control signal, and a power signal; the first part includes a baseband module and a chip-to-line interface module for interfacing between the baseband module and the single transmission line; and the second part includes a RF module and a line-to-chip interface module for interfacing between the RF module and the single transmission line, wherein the first part and the second part are located away from each other

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
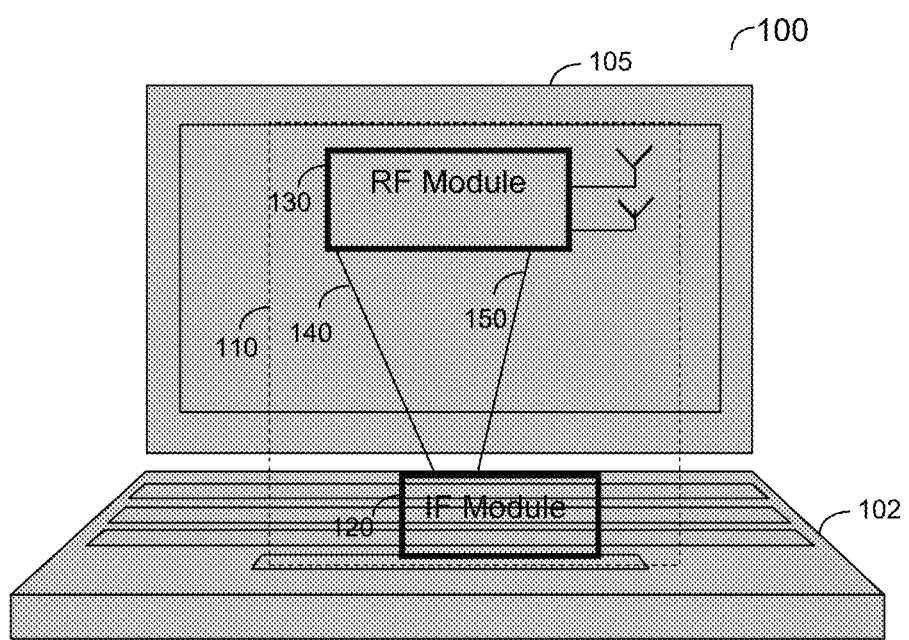
FIG. 1 is a diagram illustrating the assembly of a laptop computer having radio transmission capabilities in the 60 GHz band.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein enable the connectivity of various RF modules using a single transmission line. In one embodiment, the connectivity is between a baseband module and a RF module, including active electrical elements in an electronic device having a distributed form factor of a motherboard and RF module.

Figure 2:
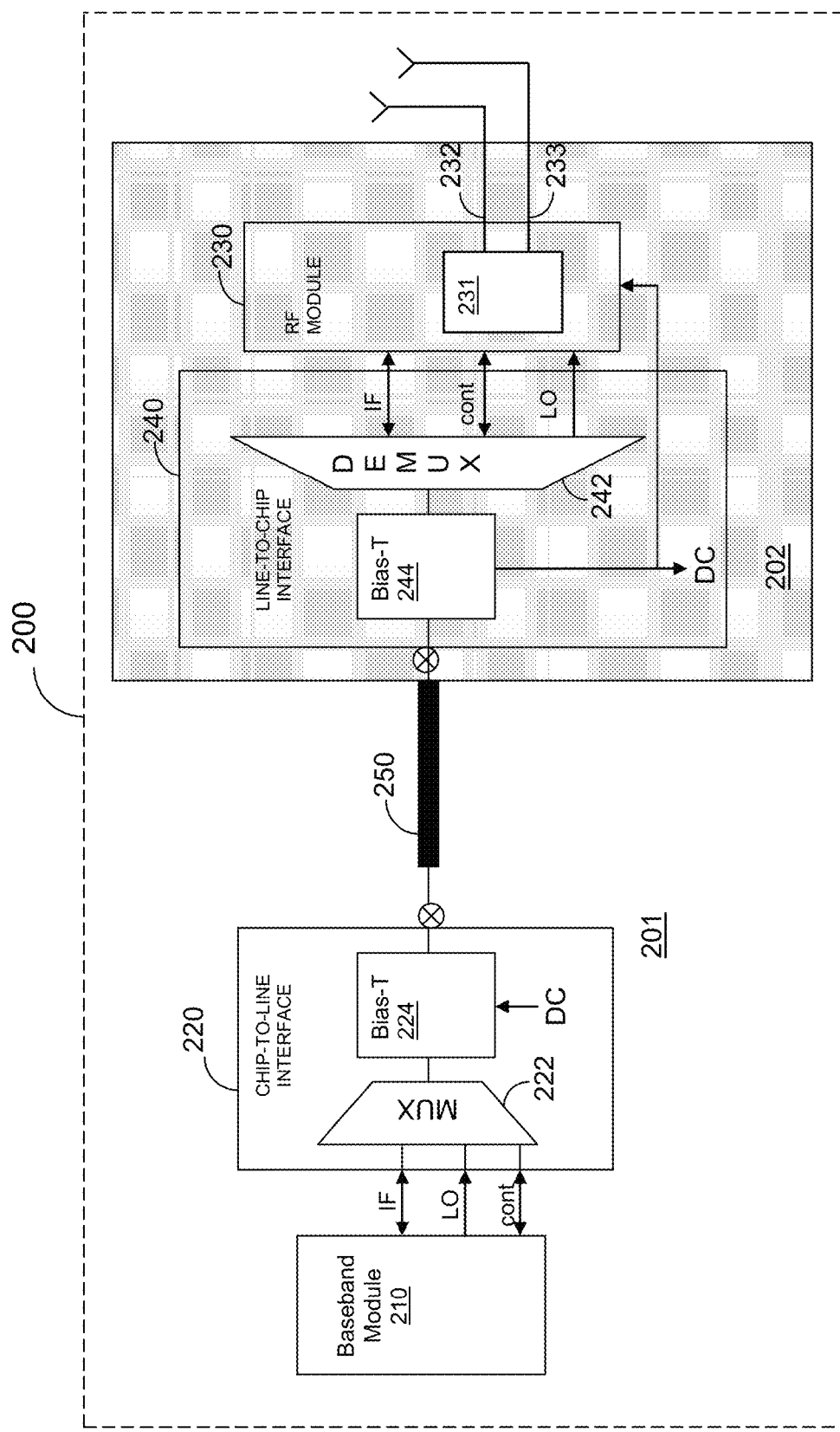
FIG. 2 is a diagram of a RF system constructed according to an embodiment of the invention.

A schematic diagram of an RF system 200 utilized to describe various embodiments of the invention is illustrated in FIG. 2. The RF system 200 includes a baseband module 210 coupled to a chip-to-line interface module 220. In addition, the RF system 200 includes an RF module 230 coupled to a line-to-chip interface unit 240. The RF module 230 comprises a RF circuitry 231 to perform up and down conversions of radio signals and to control the TX and RX active antennas 232 and 233. In an embodiment of the invention, each of the antennas 232 and 233 is a phase array antenna. The RF system 200 enables the efficient transmission and reception of signals in at least the 60 GHz band.

The baseband module 210 and RF module 230 are apart from each other and are connected using a single transmission line 250 through the interfaces 220 and 240. In one embodiment, the baseband and RF modules 210 and 230 are respectively located at the base and lid planes of a laptop computer. One of ordinary skill should appreciate that a connection between these planes is using, for example, a cable. Placing the baseband and RF modules 210 and 230 apart from each is required to locate the active antennas at such a location where optional reception/transmission of signals may be achieved. Such a location is typically not in proximity to the baseband module which is usually placed by the device's fan/ventilation. As another example, at a tablet computer, the baseband and RF modules 210 and 230 are located at opposite ends of the tablet.

At least four different signals are simultaneously transferred over the transmission line 250 including, but not limited to, power, control, intermediate frequency (IF), and local oscillator source (LO). It should be noted that the IF and control signals are transferred over the line 250 in both directions. The control signal controls, at least, the switching of the TX and RX active antennas, the direction of the antenna (beam forming), and gain control. The LO signals are required to synchronize the two modules and to perform up and down conversions of high frequency signals.

Each signal transferred over the transmission line 250 has a different frequency band. In an embodiment of the invention, a frequency plan is disclosed that enables the efficient transfer of the five signals over the transmission line 250. In accordance with an embodiment of the invention, the transmission line 250 is a standard micro coaxial cable. In this embodiment, the connection between the PCS and the micro coaxial cable is using a micro connector. According to another embodiment, the transmission line 250 can be formed by fabricating a metal line on a multilayer substructure.

During the simultaneous transfer of the LO, IF, control and power signals over the transmission line 250, the interface units 220 and 240 are utilized. The interface units 220 and 240 multiplex the various signals and impedance matches between the transmission line 250 and the PCBs to which the modules 210 and 230 are connected to.

As shown in FIG. 2, the chip-to-line interface unit 220 includes a multiplexer 222 and a Bias-T unit 224 and the line-to-chip interface unit 240 includes a demultiplexer 242 and a Bias-T unit 244. The multiplexer 222 multiplexes the IF signal, LO signal, and control signal to be output on a single output provided to the input of the Bias-T unit 224. The Bias-T unit 224 adds a DC voltage signal from a power source and outputs the signal to the transmission line 250. The multiplexer 222 also performs a demultiplexing operation to produce the IF signal(s) and control signal transferred from the RF module 230.

The demultiplexer 242 de-multiplexes the input received on the transmission line 250, to generate the control signal, IF signal, and LO signal. Prior to that, the Bias-T unit 244 extracts the DC voltage signal to power the RF module 230. It should be noted that the DC voltage signal is always provided to the RF module 230 to enable proper operation. The demultiplexer 242 also performs a multiplexing operation on the IF signal (results of a down conversion of the received RF signals) and control signal to be transferred to the baseband module 210.

In the embodiment illustrated in FIG. 2, the multiplexer 222 and Bias-T unit 224 are integrated in the baseband module 210 which are embedded in an RFIC. In the same fashion, the demultiplexer 242 and Bias-T unit 244 are integrated in the RF module 230, which is fabricated as an RFIC. In another embodiment, the multiplexer 222 and demultiplexer 242 are part of the baseband and RF modules respectively, thus are part of RFICs. The Bias-T units 224 and 244, on the other hand, are part of PCBs 201 and 202, thus the DC signal multiplexing/demultiplexing is performed over the PCBs.

In an embodiment of the invention the source of the LO signal is at the RF module 230. Accordingly, the LO signal is multiplexed with the received IF signal (after down conversion) and transferred to the baseband module 210 over the transmission line 250.

In the embodiment shown in FIG. 2, the baseband module 210 and RF module 230 are fabricated on different substrates and connected using a transmission line (e.g., a cable). According to another embodiment of the invention, the RF and baseband modules are fabricated on the same substrate and are connected using a coaxial cable. In this embodiment, the techniques disclosed herein for multiplexing the signals are also applied.

Figure 3:
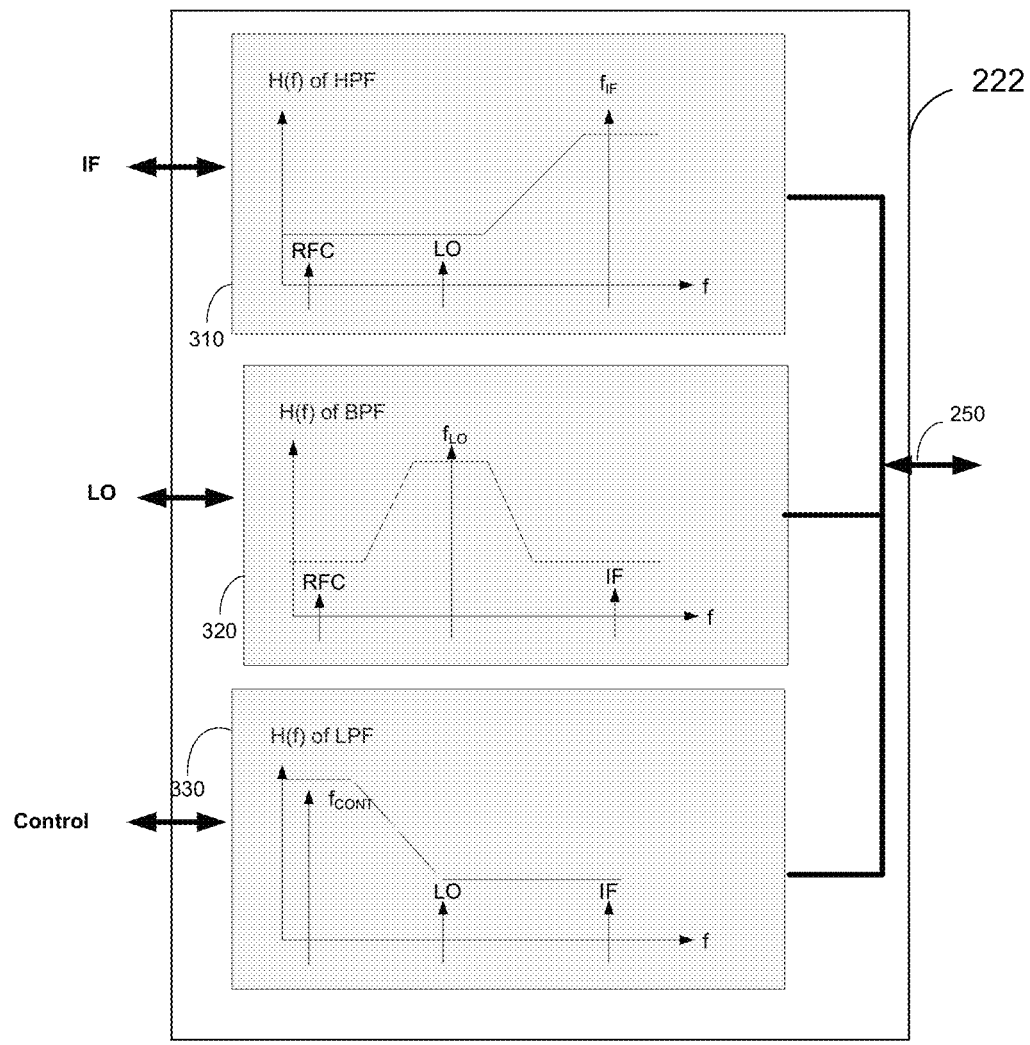
FIG. 3 is a diagram of a multiplexer constructed according to an embodiment of the invention.

FIG. 3 shows a non-limiting block diagram of the multiplexer 222 constructed in accordance with an embodiment of the invention. The multiplexer 222 separates the frequency spectrum to three different frequency bands: $f_{IF}$, $f_{LO}$, and $f_{CTRL}$ to multiplex the LO signal, IF signal, and control signal in these bands respectively. Specifically, the multiplexer 222 includes a high-pass filter (HPF) 310, a base-pass filter (BPS) 320, and a low-pass filter (LPF) 330; each passes signals in the $f_{IF}$, $f_{LO}$, and $f_{CTRL}$ respectively.

Figure 4:
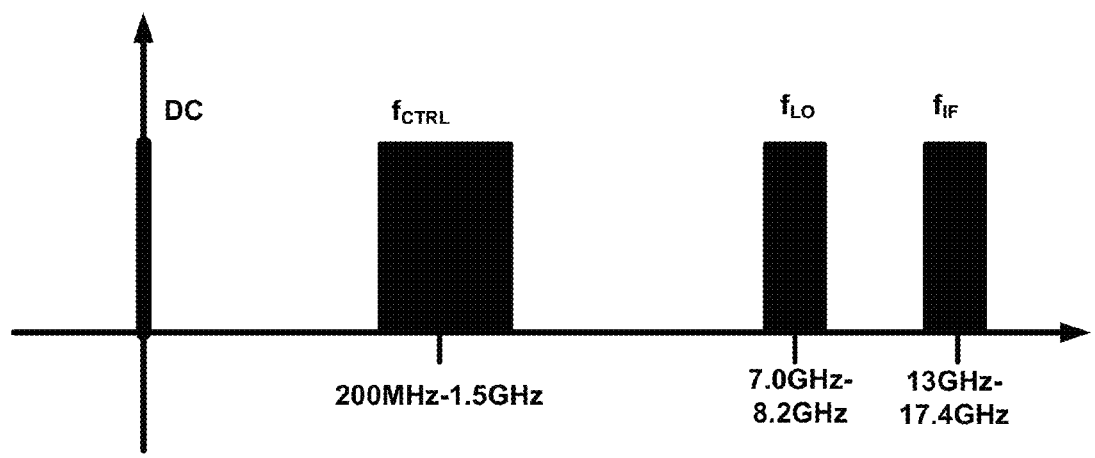
FIG. 4 is a diagram of a frequency plan utilized for multiplexing signals according to an embodiment of the invention.

In accordance with an embodiment, to ensure reliable transfer of signals over the transmission line 250, the frequencies of $f_{IF}$, $f_{LO}$, and $f_{CTRL}$ are set to 13-17.4 GHz, 7-8.2 GHz, 200 Mhz-1.5 GHz respectively. This frequency plan is also illustrated in FIG. 4. According to another embodiment, the frequency plan may be set as follows: the $f_{IF}$ is 13 GHz to 17.4 GHz; the $f_{LO}$ is below 1 GHz, and the $f_{CTRL}$ is 200 MHz to 1.5 GHz. According to another embodiment of the invention, the $f_{IF}$ is 5 GHz to 10 GHz, the $f_{LO}$ band is below 100 MHz, and the $f_{CTRL}$ is above 10 GHz. Yet in another embodiment, the frequency plan is: $f_{IF}$ is 5 GHz to 10 GHz, the $f_{LO}$ is above 15 GHz, and the $f_{CTRL}$ of the control signal is 200 MHz to 1.5 GHz.

In another embodiment, when the control and IF signal never overlap during the operation, it is safe to use the same frequency band for control and IF signal, by sharing hardware elements, such as RX and TX circuitry, and matching networks, thereby reducing the complexity of multiplexing the signals.

The demultiplexer 242 has the same structure as the multiplexer 222 and also includes a high-pass filter (HPF), a base-pass filter (BPS), and a low-pass filter (LPF) that filter the multiplexed signal received on the line 250 to the IF signal, LO signal, and control signal respectively.

Figure 5A:
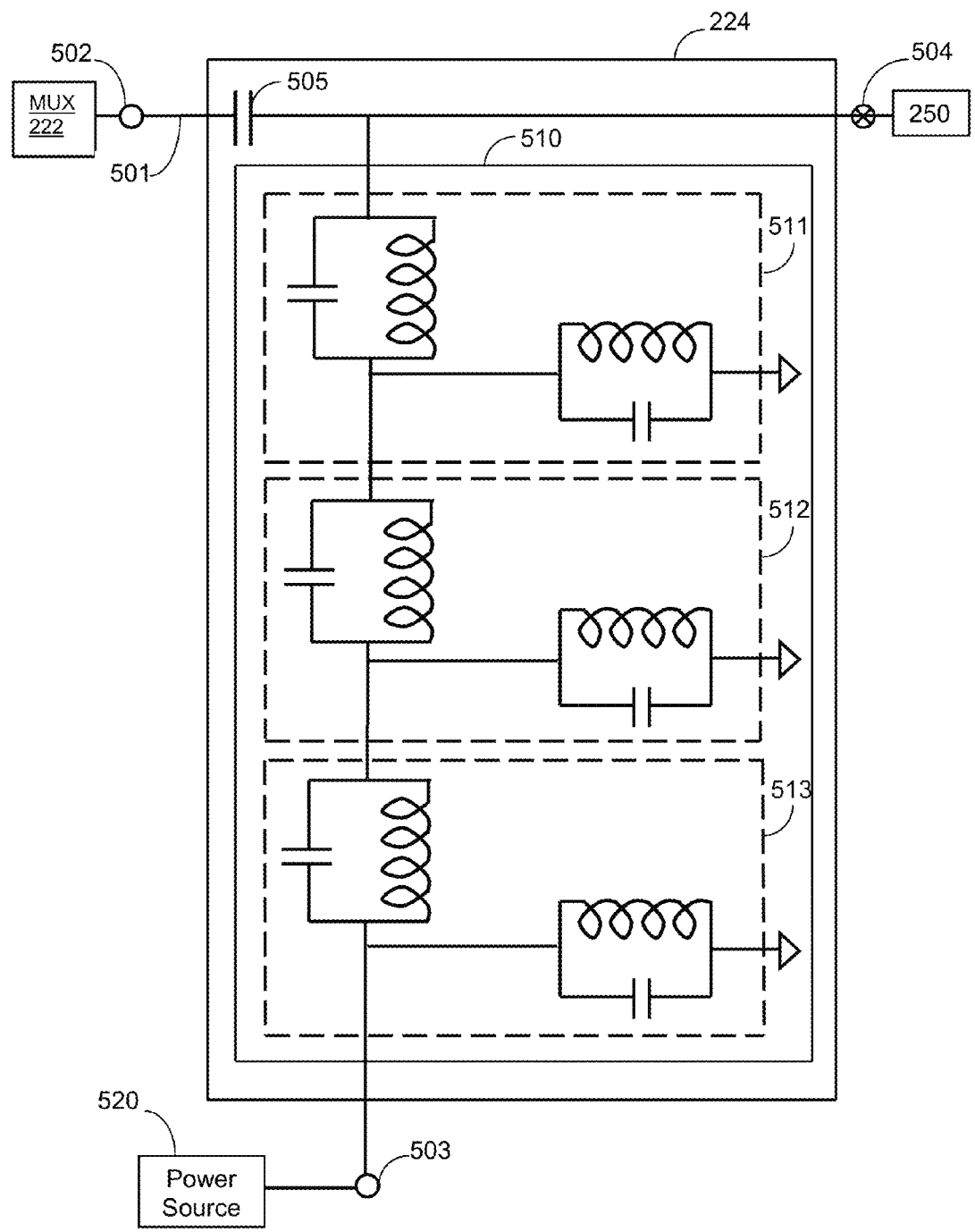
FIGS. 5A and 5B are diagrams of a bias-T unit designed according to an embodiment of the invention.

FIG. 5A is an exemplary and non-limiting electrical diagram equivalent to the bias-T unit 224 implemented according to an embodiment of the invention. The unit 224 is connected to the metal line 501 between the output of the multiplexer 222 and a connector 502 of the transmission line 250. The metal line 501 is printed on the PCB.

A typical bias-T is a three-port network used for setting a DC bias point of an electronic element without disturbing other elements. The low frequency port is used to set the bias, a high frequency port passes the radio frequency signals but blocks the biasing levels, and a combined port connects to the device, which sees both the bias and RF. A conventional bias-T is based on a capacitor that allows AC through but blocks the DC bias and an ideal inductor that blocks AC, but allows DC. The conventional bias-T cannot be utilized in millimeter-wave frequency, as there are no explicit inductors available based on PCB traces and/or PCB mounted. Further, a conventional bias-T cannot be utilized in the proposed solution, as there are at least 3 different frequencies (i.e., AC) that should be passed or blocked by the bias-T module.

According to certain embodiments of the invention, the inductor is replaced by a resonance network that resonates at the frequency bands of the LO, IF and control signals. As illustrated in FIG. 5A, the Bias-T unit 224 includes a capacitor 505 and a resonance network 510 for inserting DC voltage signal provided by a power source 520, at a port 503, to the high frequency multiplexed signal output by the multiplexer 222. In certain embodiments of the invention, the capacitor 505 is part of the multiplexer 222, i.e., fabricated in the RFIC containing the multiplexer 222. The output at the connector 504 includes multiplexed LO, IF and control signals with a DC signal. The Bias-T unit 224 blocks the DC levels from returning to the input port 502 using the capacitor 505.

The resonance network 510 introduces to the metal line 501 an open circuit for the $f_{LO}$, $f_{IF}$, and $f_{CTRL}$ frequencies. Specifically, the resonance network 510 includes 3 sub-networks 511, 512, and 513 designed to resonate in the $f_{LO}$, $f_{IF}$, and $f_{CTRL}$ frequencies respectfully, thus blocking AC signals at these frequencies. This is achieved as each sub-network shorts the signal at the resonance frequency. The capacitor (C) and inductor (L) values are defined according to the resonance frequency.

Figure 5B:
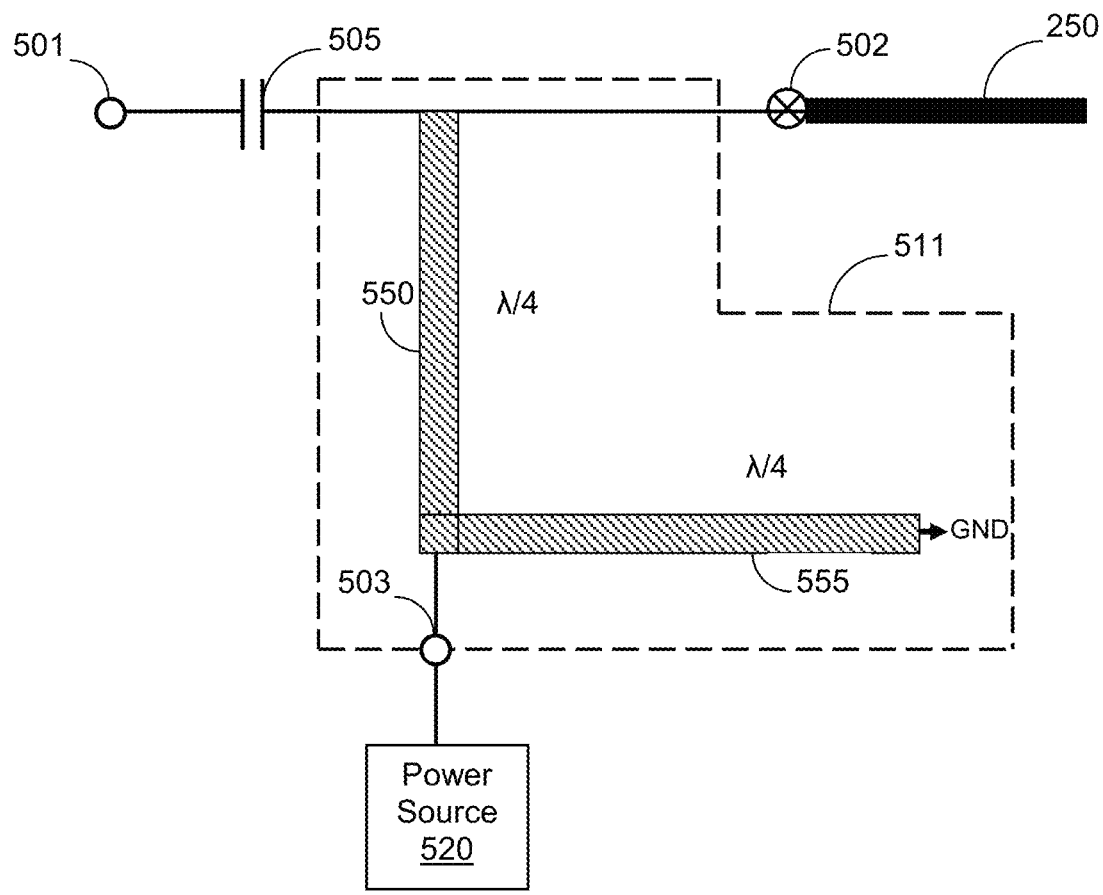

In an embodiment of the invention, the resonance network 510 is implemented using a transmission line, to meet the constraints of millimeter-wave circuits. An exemplary and non-limiting diagram illustrating the implementing of one of the sub-networks, e.g., a sub-network 511 is shown in FIG. 5B.

Each branch of an LC circuit is replaced by a transmission line having a length of a quarter of a wavelength ($\lambda/4$). The wavelength corresponds to the resonance frequency, i.e., one of the $f_{LO}$, $f_{IF}$, and $f_{CONT}$ frequencies ($\lambda=c/f$, where c is the speed of light and f is the frequency). The transmission line 550 is connected to the power source 520, while the transmission line 555 is connected to the ground. Thus, the structure shown in FIG. 5B, opens (i.e., provides a very high impedance) signals at the resonance frequency and allows DC signal to pass to the connector 502.

Figure 6A:
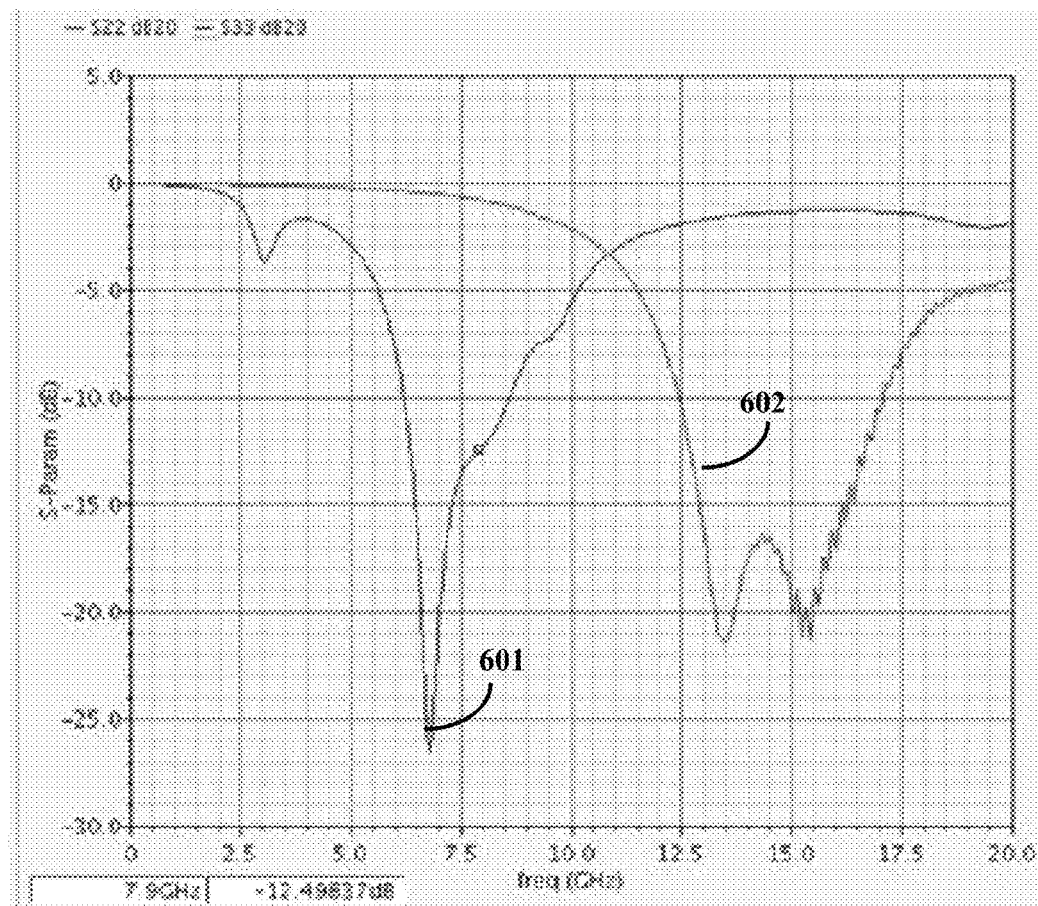
FIG. 6A depicts graphs illustrating return loss varying with frequency measured for the LO and IF signals multiplexed by the proposed solution.

FIG. 6A depicts graphs 601 and 602 of a return-loss varying with the frequency measured at the connection of the transmission line 250 to the PCB at the RF module 230. The graph 601 and 602 respectively represent the LO signal and the IF signal of the multiplexed signal output by the multiplexer 222. The return-loss is a measure of voltage standing wave ratio (VSWR), expressed in decibels (dB) and may be caused due to an impedance mismatch. A high value of return-loss denotes better quality of the electrical element under test. As can be noticed for frequency bands $f_{LO}$ (7 GHz-8.2 GHz) and $f_{IF}$ (13 GHz-17 GHz), the measured return-loss is well above +10 dB. A person with ordinary skill in the art should appreciate that such a result represents a low return-loss value, thus good performance of the signals transmitted to the RF module.

Figure 6B:
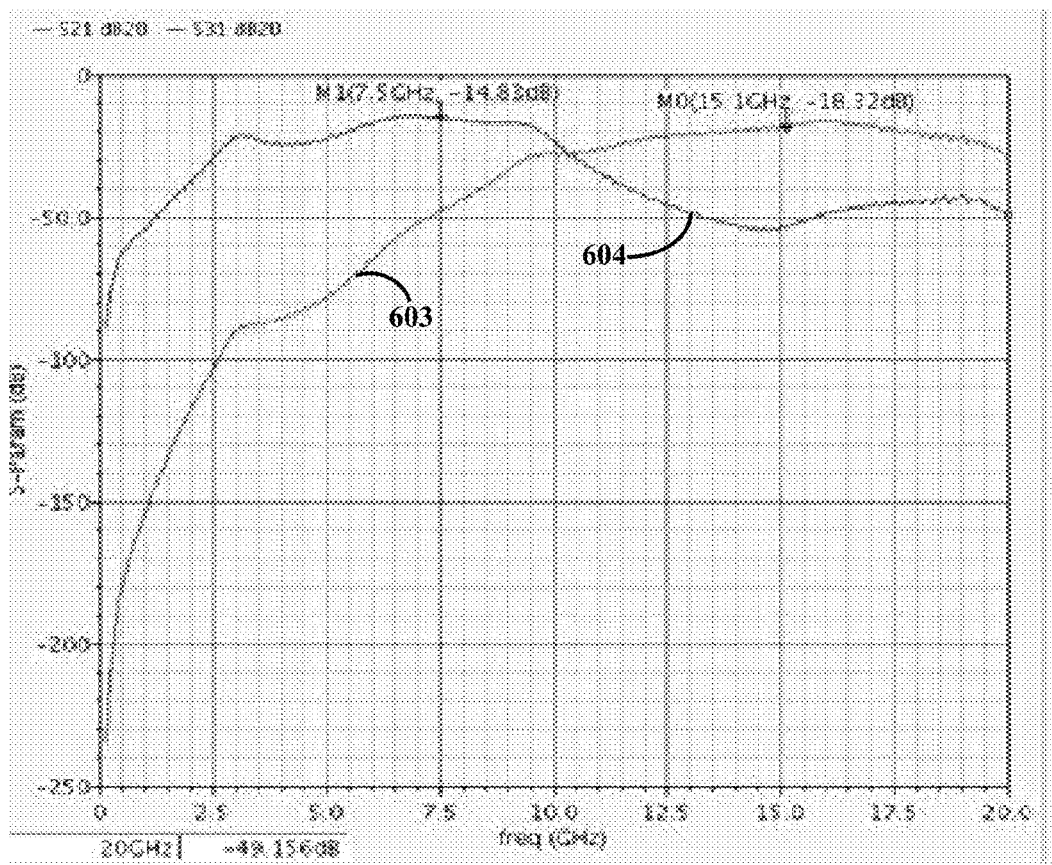
FIG. 6B depicts graphs illustrating channel transmission loss measured for the LO and IF signals multiplexed by the proposed solution.

FIG. 6B depicts graphs 603 and 604 representing the loss of the LO and IF signals measured from the path of a PCB point at the input of the transmission line (250) through the line (250), to a PCB point at the output of the transmission line (250) at the RF module. The measurement is for the frequency spectrum of the multiplexed signal, which is between DC and 20 GHz. As can be noticed, in the entire frequency band the loss of both signals is below +10 dB. A person with ordinary skill the art should appreciate that such a result represents good performance of the disclosed solution.

It is important to note that these embodiments are only examples of the many advantageous uses of the innovative teachings herein. Specifically, the innovative teachings disclosed herein can be adapted in any type of consumer electronic devices where reception and transmission of millimeter wave signals is needed. Moreover, some statements may apply to some inventive features but not to others. In general, unless otherwise indicated, it is to be understood that singular elements may be in plural and vice versa with no loss of generality.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A millimeter-wave radio frequency (RF) system, comprising:
   a single transmission line for connecting a first part of the RF system and a second part of the RF system, the single transmission line transfers a multiplexed signal between the first part and second part, wherein the multiplexed signal includes an intermediate frequency (IF) signal, a local oscillator (LO) signal, a control signal, and a power signal;
   the first part includes a baseband module and a chip-to-line interface module for interfacing between the baseband module and the single transmission line, wherein the chip-to-line interface module includes a multiplexer for multiplexing the IF signal, the LO signal, and the control signal and producing a first multiplexed signal; a bias-T coupled to the multiplexer for inserting the power signal to the first multiplexed signal to produce the multiplexed signal to be transferred over the single transmission line, wherein the bias-T is connected to the single transmission line, wherein the multiplexer includes a high-pass filter (HPF) for passing signals at an IF frequency band of the IF signal; a base-pass filter (BPS) for passing signals at a LO frequency band of the LO signal; and a low-pass filter (LPF) for passing a signal at a control frequency band of the control signal, wherein the IF frequency band, the LO frequency band, and the control frequency band are set according to a frequency plan, wherein the multiplexer further de-multiplexes the IF signal, the LO signal and a control signal received from the RF module over the single transmission line; and
   the second part includes a RF module and a line-to-chip interface module for interfacing between the RF module and the single transmission line, wherein the first part and the second part are located away from each other.

2. The millimeter-wave RF system of claim 1, wherein the millimeter-wave RF system operates at least at a 60 GHz frequency band.

3. The millimeter-wave RF system claim 2, wherein the RF module includes an active antenna array for receiving and transmitting signals at least at the 60 GHz frequency band.

4. The millimeter-wave RF system claim 1, wherein the transmission line is any one of: a micro coaxial cable and a metal line fabricated on a multilayer substrate.

5. The millimeter-wave RF system of claim 1, wherein the frequency plan defines separation of a frequency spectrum to the IF frequency band, the LO frequency band, and the control frequency band.

6. The millimeter-wave RF system of claim 5, wherein the frequency plan is any one of:

a) the IF frequency band is 13 GHz to 17.4 GHz, the LO band is 7 GHz to 8.2 GHz, and the control band is 200 MHz to 1.5 GHz;

b) the IF frequency band is 13 GHz to 17.4 GHz; the LO band is below 1 GHz, and the control band is 200 MHz to 1.5 GHz;

c) the IF frequency band is 5 GHz to 10 GHz, the LO band is below 100 MHz, and the control band is above 10 GHz; and d) the IF frequency band is 5 GHz to 10 GHz, the LO band is above 15 GHz, and the frequency band of the control signal is 200 MHz to 1.5 GHz.

7. The millimeter-wave RF system of claim 1, wherein the bias-T unit is connected to a power source and includes:
   a network of transmission lines for blocking the IF signal, the LO signal, the control signal from reaching the power source.

8. The millimeter-wave RF system of claim 7, wherein the network of transmission lines includes three pairs of transmission lines, wherein each pair of transmission lines is designed to short a signal at its respective frequency band, a length of each transmission line is a quarter of a wavelength respective of the signal's frequency band, wherein the frequency band is any one of the IF frequency band, the LO frequency band, and the control frequency band.

9. The millimeter-wave RF system claim 1, wherein the line-to-chip interface module comprises:
   a bias-T connected to the single transmission line for extracting the power signal from the multiplexed signal to produce a second multiplexed signal;
   a de-multiplexer coupled to an output of the bias-T for de-multiplexing the IF signal, the LO signal, and the control signal from the second multiplexed signal.

10. The millimeter-wave RF system claim 9, wherein the de-multiplexer includes:
    a high-pass filter (HPF) for passing signals at an IF frequency band of the IF signal;
    a base-pass filter (BPS) for passing signals at a LO frequency band of the LO signal; and
    a low-pass filter (LPF) passing a signal at a control frequency band of the control signal, wherein the IF frequency band, the LO frequency band, and the frequency band are set according to a frequency plan utilized for setting a multiplexer in the chip-to-line interface module.

11. The millimeter-wave RF system of claim 9, wherein the de-multiplexer further multiplexes the IF signal and a control signal to be transferred to the baseband module over the single transmission line.

12. The millimeter-wave RF system of claim 9, wherein the first part is integrated in a first RF integrated circuit (RFIC) and the second part is integrated in a second RF integrated circuit (RFIC), wherein each of the first RFIC and the second RFIC is mounted on a first printed circuit board (PCB) and second PCB respectively, and first and second PCBs are apart from each other.

13. The millimeter-wave RF system of claim 12, the chip-to-line interface module matches impedance between the first PCB and the single transmission line, and wherein the line-to-chip interface module impedance matches between the second PCB and the single transmission line.

14. The millimeter-wave RF system of claim 1, wherein the first part is located at a base plane and the second part is located at a lid plane of a laptop computer.

15. A method for transferring a plurality of signals over a single transmission line connected between modules of a millimeter-wave RF system, said method comprising:

setting a frequency plan for separating a frequency spectrum to an IF frequency band, a local oscillator (LO) frequency band, and a control frequency band;

at a first module of the RF system, performing:
   multiplexing, using a plurality of frequency filters, an IF signal, a LO signal, and a control signal to produce a first multiplexed signal, wherein the IF signal, the LO signal, and the control signal are respectively passed at the IF frequency band, the LO frequency band, and the control frequency band;
   inserting a power signal to the first multiplexed signal to produce a second multiplexed signal including the IF signal, the LO signal, the control signal, and the power signal;
   transferring the second multiplexed signal to a second module of the RF system over the single transmission line; and at the second module of the RF system, performing:
   extracting the power signal from the second multiplexed signal; and
   de-multiplexing, using a plurality of frequency filters, from the second multiplexed signal, the IF signal, the LO signal, and the control signal.

16. The method of claim 15, wherein the first module is a baseband module and the second module is a RF module including at least an active antenna array, wherein the first module and the second module are located away from each other.

17. The method of claim 15, wherein the frequency plan is any one of:
   a) the IF frequency band is 13 GHz to 17.4 GHz, the LO band is 7 GHz to 8.2 GHz, and the control band is 200 MHz to 1.5 GHz;
   b) the IF frequency band is 13 GHz to 17.4 GHz, the LO band is below 1 GHz, and the control band is 200 MHz to 1.5 GHz;
   c) the IF frequency band is 5 GHz to 10 GHz, the LO band is below 1 GHz, and the control band is above 10 GHz; and
   d) the IF frequency band is 5 GHz to 10 GHz, the LO band is above 15 GHz, and the frequency band of the control signal is 200 MHz to 1.5 GHz.

\* \* \* \* \*